Oct. 12, 1965    E. FRANKLIN    3,211,002
THERMOMETER DEVICES
Filed Dec. 8, 1960    2 Sheets-Sheet 1
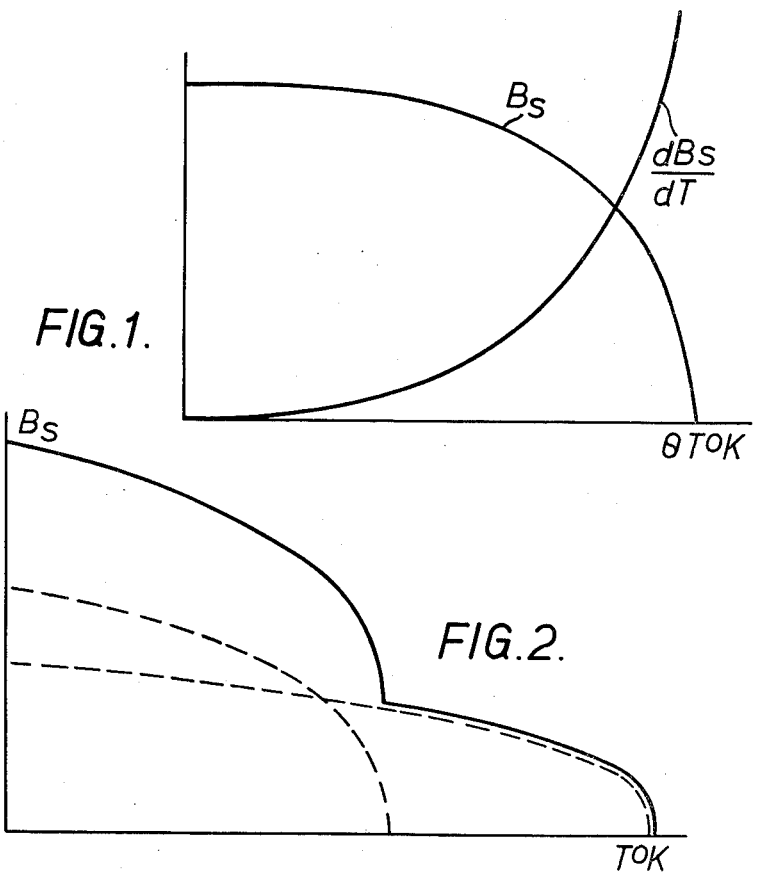
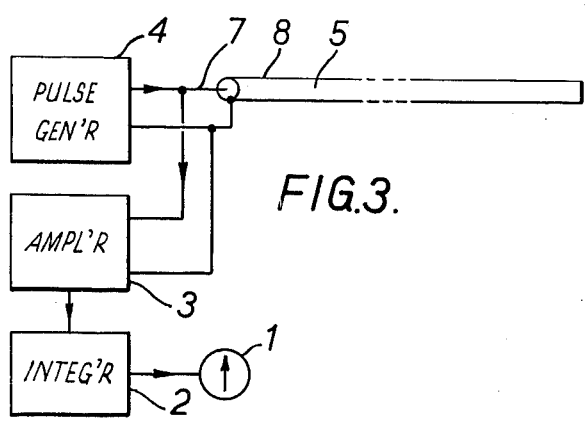

Oct. 12, 1965 E. FRANKLIN 3,211,002
THERMOMETER DEVICES
Filed Dec. 8, 1960 2 Sheets-Sheet 2
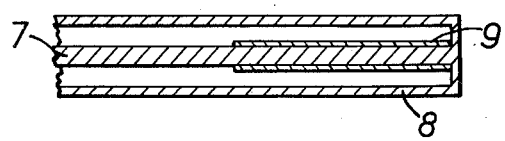
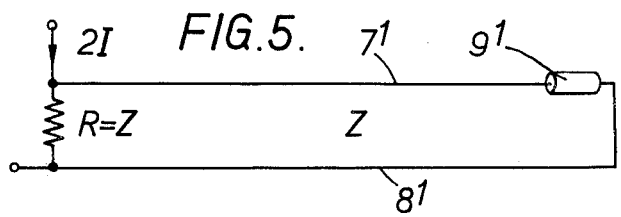
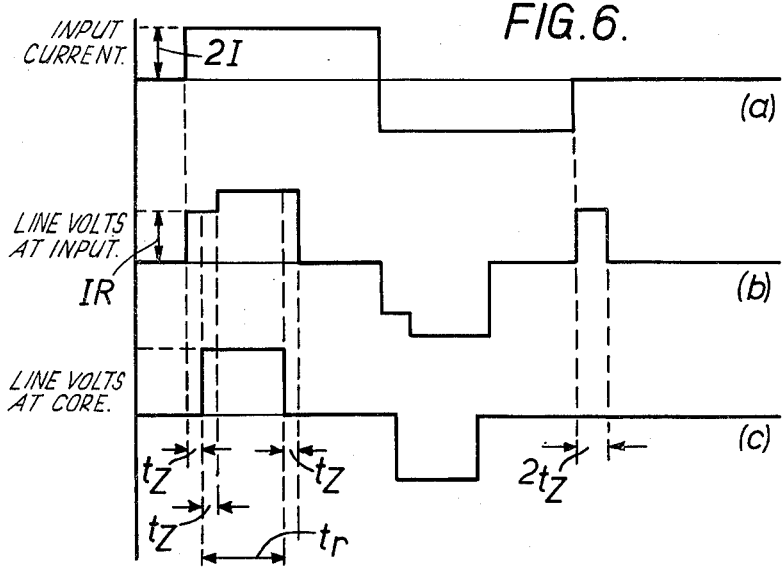

United States Patent Office

3,211,002
Patented Oct. 12, 1965

3,211,002
THERMOMETER DEVICES
Ernest Franklin, Abingdon, England, assignor to United Kingdom Atomic Energy Authority, London, England
Filed Dec. 8, 1960, Ser. No. 74,543
Claims priority, application Great Britain, Dec. 12, 1959, 42,328
6 Claims. (Cl. 73—362)

This invention relates to thermometer devices and has one application in measuring temperatures in nuclear reactors.

Present practice in measuring reactor temperatures almost invariably involves the use of thermocouples. These have certain disadvantages, the three main ones being:

(a) Their output voltage is small; moreover since it varies approximately linearly with temperature from room temperature upwards, the fractional voltage change becomes smaller as the temperature rises and becomes very small in the range of reactor operating temperatures.

(b) They are not basically "fail-safe" in operation, since most fault conditions which arise result in a reduced output voltage equivalent to a lower temperature.

(c) Their output signal is D.C., which is less readily amplified without zero drift than an A.C., signal.

According to the present invention a thermometer device comprises a ferromagnetic core forming a temperature-sensitive element, means for applying current pulses of alternate polarity to saturate the core in alternate directions of magnetization, and means for integrating corresponding output voltage pulses from the core, the voltage-time integral of said output pulses being a measure of the temperature of the core.

In one form of the present invention a thermometer device comprises a transmission line having a shorted end, a ferromagnetic core linking a conductor of the line adjacent the shorted end, means for applying current pulses of alternate polarity to the unshorted end to saturate the core in alternate directions of magnetization, and means for integrating the voltage pulses appearing at the unshorted end as a result of reflections from the shorted end.

A thermometer device according to the present invention may comprise a coaxial transmission line having a shorted end and an unshorted end terminated with the characteristic impedance thereof, a rectangular hysteresis loop ferromagnetic core located on the inner conductor of the line adjacent the shorted end, means for applying current pulses of alternate polarity to the unshorted end to saturate the core in alternate directions of magnetization, and means for integrating the voltage pulses appearing at the unshorted end as a result of reflections from the shorted end. The pulses may be generated in contiguous pairs, and the core may comprise at least two sections having different Curie temperatures.

To enable the nature of the present invention to be more readily understood, attention is directed to the accompanying drawing wherein:

FIG. 1 is a curve of saturation flux density against temperature for a ferromagnetic material.

FIG. 2 is a curve of saturation flux against temperature for a composite ferromagnetic system.

FIG. 3 is a schematic diagram of one example of a thermometer device embodying the present invention.

FIG. 4 is a longitudinal section of a shorted coaxial line used in the device of FIG. 3.

FIG. 5 is an equivalent circuit diagram of the device shown in FIG. 3.

FIG. 6 shows waveforms in the circuit of FIG. 5.

Thermometer devices according to the present invention utilise the change in voltage-time integral required to saturate a ferromagnetic core as the temperature thereof changes.

Referring to FIG. 1, it will be seen that if the saturation magnetic flux density, $B_s$, of a ferromagnetic core is plotted against the absolute temperature, its rate of change increases from zero at absolute zero to infinity at the Curie temperature. The value of saturation flux density thus gives an increasingly sensitive indication of temperature as the Curie temperature is approached.

Materials with a wide range of Curie temperature are available. By suitable choice of alloying ratios of iron, nickel and cobalt, Curie temperatures from room temperature up to 1130° C. can be obtained. A typical figure for the variation of Curie temperature from sample to sample of a batch of commercial material is ±0.5° C. while from batch to batch of nominally the same material the variation is about ±2° C.

The general form of the curve of FIG. 1 is well suited to temperature measurement in a plant operating at a fairly fixed high temperature such as a nuclear power reactor. During the run-up period from room temperature, a rough indication of temperature is given by the low slope of the curve, and this indication becomes progressively more sensitive as the normal operating temperature is approached.

Consider for example a case in which the desired operating temperature is 450° C. (723° K.), and assume that a magnetic material is used whose saturation flux density at this temperature is one half that at 0° K. This means that the operating point is about 10% below the Curie temperature on the absolute scale, giving a temperature of about 803° K. or 530° C. There is thus a latitude of 80° C. above the operating temperature over which the temperature can be measured. At room temperature, say 20° C. or 293° K., the slope of the curve and therefore the sensitivity of temperature indication are about 5% of that at the operating temperature, but this will normally give quite sufficient accuracy for run-up purposes.

If the 80° C. latitude above the normal operating temperature is too small, it can be extended by using two materials with slightly different Curie temperatures arranged with their flux paths in parallel. This technique can be extended by using two materials with very different Curie temperatures to produce a curve with two high-slope regions as shown in FIG. 2, where the broken lines are the curves of the two materials used separately and the solid line is the curve for the composite system. The latter arrangement can provide one high-sensitivity region around a normal operating temperature and a second such region around an alarm or "fuse" temperature which can be either higher or lower than the operating temperature. Further high-sensitivity regions can be obtained by using further suitable materials.

In the embodiment of the present invention hereinafter described, a probe is provided for insertion in a hole in a nuclear reactor only 0.020 inch in diameter. Referring to FIGS. 3 and 4, the probe takes the form of a short-circuited transmission line 5 of outside diameter 0.020" having an inner conductor 7 and an outer conductor 8. A film-type core 9 of magnetic material having a rectangular hysteresis loop is deposited on the inner conductor adjacent the short-circuit to form the temperature-sensitive element. Suitable constructional materials for the inner and outer conductors are copper and stainless steel respectively, insulation between the two conductors being provided by magnesium oxide in a known manner. The insulation is omitted from FIG. 4 for clarity.

With a deposited film 2 inches long and 0.0005 inch thick made of electro-deposited 80/20 nickel/iron alloy, which has a saturation flux density of about 5000 gauss at an operating temperature of about 500° C. (approximately 10,000 gauss at room temperature), the saturation pulse area is about 0.65 microsecond-volt. Thus to reverse the core flux in say, 1 microsecond, a mean voltage of about 0.65 volt has to be applied across the portion of the inner conductor linking the core. Assuming the coercive force of the core to be about 1 oersted and the diameter of the inner conductor to be about 0.010 inch, the coercive current would be about 65 ma., giving the core and conductor an effective impedance of about 10 ohms under those conditions. The core can thus be matched approximately into a transmission line whose characteristic impedance, Z is 10 ohms, which is obtained by making the internal diameter of the outer conductor 8 about 0.012 inch.

The drive current is applied to the core from a pulse generator 4 in the form of contiguous pairs of positive and negative pulses as shown in FIG. 6(a). (The waveforms in FIG. 6 are not drawn to scale.) Suitable pulses for driving the above-described core have an amplitude of about 100 ma., a duration of about 2 microseconds, and a rise-time short compared with the magetisation reversal time of the core. These pulses are conveniently provided by two conventional transistor blocking oscillators, the second of which is triggered by the trailing edge of the pulse from the first, and the first of which is triggered from a free-running transistor relaxation oscillator operating at a frequency of about 1000 c./s. The pulse pairs need not be contiguous, but this arrangement is preferable since the core flux is then the same before and after each pair of pulses: hence the net voltage-time integral across the conductor is zero and there can be no change in the D.C. level of any A.C. couplings in the circuit.

The input end of the line is terminated by a resistance R equal to Z, as shown in the equivalent circuit of FIG. 5, to prevent reflections back to the core, so that a positive input current pulse of amplitude 2I initially produces a voltage across the line of IR as shown in FIG. 6(b). This positive voltage front arrives at the core after a time $t_z$ equal to the transmission time of the line, and the magnetization of the core begins to reverse. Any mismatch between the line and core impedances causes a voltage front of appropriate sign and polarity to be propagated back to the input and causes a modification in the input voltage after a further time $t_z$ (FIG. 6(b)). Taking $t_r$ as the core reversal time, the core saturates after a total time $(t_z+t_r)$ from the start of the current pulse. This results in the propagation of a negative voltage front to the input, which reduces the input voltage to zero after a further time $t_z$. The sequence of events during the negative drive current pulse is similar.

At the end of the negative current pulse a positive voltage front, again of amplitude IR, is propagated along the line and arrives at the core after a time $t_z$, reducing the current coupling the core to zero. Because of the rectangular hysteresis loop substantially no flux change takes place in the core and no E.M.F. is induced in the inner conductor. A negative voltage front is therefore propagated back to the input from the shorted end which returns the input voltage to zero after a total time $2t_z$ from the end of the current pulse.

The voltage pulses appearing at the line input are amplified and integrated in a conventional manner by an amplifier 3 followed by a two-phase integrator 2, the integrator output being shown on a meter 1. It will be seen that the area of each of the voltage pulses produced at the line input (FIG. 6(b)) following the start of the drive pulse is equal to a small constant area 2IR$t_z$, plus the area of the pulse cross the inner conductor coupling the core. It can be shown that the area of this latter pulse is always proportional to the saturation flux density of the core, despite any mismatch between the line and core impedances. The reading on the meter 1 is therefore an indication of the temperature of the core 9.

As a check on the stability of operation, a further similar core can be provided which is maintained at room temperature and which can be switched into the circuit in place of the probe core. Because of the low slope of the saturation flux-density curve at room temperature, as hereinbefore described, it is not necessary to stabilise the temperature of this further core unless great accuracy is required.

The described embodiment uses a core having a substantially rectangular hysteresis loop. Although not essential, a core having this form of loop is preferable because the measured saturation flux is then very little dependent on the amplitude of the drive current.

The type of composite saturation flux-density curve described with reference to FIG. 2 can be obtained by substituting for the uniform core 9 a composite core the sections of which have different Curie temperatures. The sections may consist of bands of magnetic material deposited side-by-side on the inner conductor, or of two or more superimposed layers of magnetic material.

Although the described embodiment is intended for use in nuclear reactors, the invention is not restricted to such use and can be used in other temperature measurement applications.

I claim:
1. A thermometer device comprising a transmission line having a shorted end, a ferromagnetic core linking a conductor or the line adjacent the shorted end, means for applying a discontinuous train of substantially rectangular current pulses of alternate polarity to the unshorted end to saturate the core in alternate directions of magnetization, and means for integrating the voltage pulses appearing at the unshorted end as a result of reflections from the shorted end.

2. A thermometer device comprising a coaxial transmission line having a shorted end and an unshorted end terminated with the characteristic impedance thereof, a rectangular hysteresis loop ferromagnetic core located on the inner conductor of the line adjacent the shorted end, means for applying a discontinuous train of substantially rectangular current pulses of alternate polarity to the unshorted end to saturate the core in alternate directions of magnetization, and means for integrating the voltage pulses appearing at the unshorted end as a result of reflections from the shorted end.

3. A thermometer device comprising a coaxial transmission line having a shorted end and an unshorted end, a ferromagnetic core linking the inner conductor of the line adjacent the shorted end, means for applying a discontinuous train of substantially rectangular current pulses of alternate polarity to saturate the core in alternate directions of magnetization, and means for integrating the voltage pulses appearing at the unshorted end as a result of reflections from the shorted end.

4. A device as claimed in claim 3 wherein the core has a substantially rectangular hysteresis loop.

5. A device as claimed in claim 3 wherein the pulse applying means is adapted to generate said pulses in contiguous pairs.

6. A device as claimed in claim 3 wherein the core comprises at least two sections having different Curie temperatures.

References Cited by the Examiner

UNITED STATES PATENTS

| | | | |
|---|---|---|---|
| 1,697,148 | 1/29 | Spooner. | |
| 2,163,750 | 6/39 | D'heedene | 333—32 X |
| 2,615,973 | 10/52 | Heath | 73—362 X |
| 3,054,044 | 9/62 | Shevel | 73—362 |
| 3,076,338 | 2/63 | Peltola | 73—362 |

FOREIGN PATENTS 438,489  12/26  Germany.

ISAAC LISANN, *Primary Examiner.*